US011964863B2

(12) United States Patent
Huang et al.

(10) Patent No.: US 11,964,863 B2
(45) Date of Patent: Apr. 23, 2024

(54) WATER DISPENSER

(71) Applicants: FOSHAN MIDEA CHUNGHO WATER PURIFICATION EQUIPMENT CO., LTD., Foshan (CN); MIDEA GROUP CO., LTD., Foshan (CN)

(72) Inventors: Mianchun Huang, Foshan (CN); Hexin Gu, Foshan (CN); Xingzhi He, Foshan (CN); Wenxue Du, Foshan (CN)

(73) Assignees: FOSHAN MIDEA CHUNGHO WATER PURIFICATION EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 155 days.

(21) Appl. No.: 17/723,474

(22) Filed: Apr. 19, 2022

(65) Prior Publication Data

US 2022/0332562 A1 Oct. 20, 2022

(30) Foreign Application Priority Data

Apr. 20, 2021 (CN) ......................... 202110429138.3
Apr. 20, 2021 (CN) ......................... 202120820096.1

(51) Int. Cl.
*B67D 1/10* (2006.01)
*B67D 1/00* (2006.01)
*B67D 1/08* (2006.01)
*B67D 1/12* (2006.01)

(52) U.S. Cl.
CPC ............. *B67D 1/10* (2013.01); *B67D 1/0014* (2013.01); *B67D 1/0857* (2013.01); *B67D 1/0895* (2013.01); *B67D 1/1281* (2013.01)

(58) Field of Classification Search
CPC ...... B67D 1/10; B67D 1/0014; B67D 1/0857; B67D 1/0895; B67D 1/1281
USPC ........................................................ 222/146.1
See application file for complete search history.

(56) References Cited

U.S. PATENT DOCUMENTS 6,871,675 B1 * 3/2005 Marszalec ................. C02F 9/20 141/82
2006/0076286 A1 * 4/2006 Bolin ................... B67D 3/0022 210/282
2013/0247770 A1 * 9/2013 Wilder ................. B67D 1/0857 99/281
2016/0107874 A1 * 4/2016 Wang ................... B67D 3/0022 222/144.5

* cited by examiner

*Primary Examiner* — Vishal Pancholi
*Assistant Examiner* — Robert K Nichols, II

(57) ABSTRACT

Disclosed is a water dispenser. The water dispenser includes a water outlet component; a water cooling module for accessing a water source, an output port of the water cooling module being communicated with the water outlet component through a first water pump; and/or a water heating module, an input port of the water heating module accessing the water source through a second water pump, an output port of the water heating module being communicated with the water outlet component, the water outlet component accessing the water source through the second water pump.

12 Claims, 11 Drawing Sheets

WATER DISPENSER

CROSS-REFERENCES TO RELATED APPLICATIONS

This application claims priority to Chinese Patent Application No. 202110429138.3 and 202120820096.1, both filed on Apr. 20, 2021, the entire contents of which are incorporated herein by reference.

FIELD

The present disclosure relates to the field of household appliances, in particular to a water dispenser.

BACKGROUND

In the existing water dispenser, in order to access the water source, a water pump is provided at one side of the water inlet of the water dispenser for pumping the water source into the water channel of the water dispenser. The water pump supplies water to the water cooling module and the water heating module simultaneously. During use, due to the limited internal space of the water dispenser, the water pressure will be relatively low when the water flows to the water outlet component by pumping water from one side of the water inlet. As a result, the water outlet component needs to be set at a relatively low position to discharge water by gravity, and when the water outlet component is located at a high position, the problem of insufficient water pressure will occur.

SUMMARY

The main objective of the present disclosure is to provide a water dispenser, which aims to improve the problem of insufficient water pressure when the water outlet component of the existing water dispenser discharges water at a high position.

In order to achieve the above objective, the present disclosure provides a water dispenser, including:

a water outlet component;

a water cooling module for accessing a water source, an output port of the water cooling module being communicated with the water outlet component through a first water pump; and/or a water heating module, an input port of the water heating module accessing the water source through a second water pump, an output port of the water heating module being communicated with the water outlet component, the water outlet component accessing the water source through the second water pump.

In an embodiment, the water dispenser further includes a water inlet for accessing the water source;

and the water cooling module has a room temperature water storage area communicated with the water inlet and a cold water storage area, and an input port of the second water pump is communicated with the water inlet or the room temperature water storage area.

In an embodiment, the water dispenser further includes a first valve body, and an input port of the first valve body is communicated with an output port of the second water pump, the first valve body has a first output port and a second output port, the first output port of the first valve body is communicated with the input port of the water heating module, and the second output port of the first valve body is communicated with an input port of the water outlet component.

In an embodiment, the water outlet component includes:

a second valve body, an input port of the second valve body being communicated with an output port of the first water pump and the output port of the water heating module; and a water outlet nozzle, an input port of the water outlet nozzle being communicated with an output port of the second valve body and the second output port of the first valve body.

In an embodiment, the water dispenser further includes a purification device, and an input port of the purification device is communicated with the water inlet, an input port of the water cooling module is communicated with an output port of the purification device, and the input port of the second water pump is communicated with the output port of the purification device or the room temperature water storage area.

In an embodiment, the water dispenser further includes a leak-proof component, and the purification device is communicated with the water inlet through the leak-proof component.

In an embodiment, the leak-proof component includes:

a check valve, an input port of the check valve being communicated with the water inlet; and a water leakage protector, an output port of the check valve being communicated with the input port of the purification device through the water leakage protector.

In an embodiment, the water dispenser further includes a base, and both the water cooling module and the water heating module are provided on the base, the base has a first side and a second side opposite to the first side, a center of gravity of the water cooling module and a center of gravity of the water heating module are closer to the first side than to the second side, a center of gravity of the purification device is closer to the second side than to the first side.

In an embodiment, the water dispenser further includes an electric control box provided on the base, and a center of gravity of the electric control box is closer to the second side than to the first side, and the water cooling module, the first water pump, the water outlet component, the second water pump and the water heating module are respectively electrically connected to the electric control box.

In an embodiment, the water dispenser further includes a cooling device provided on a side of the electric control box toward the base, and a center of gravity of the cooling device is closer to the second side than to the first side, the cooling device is electrically connected to the electric control box, and the cooling device is configured for cooling an inside of the water dispenser.

In an embodiment, the base has a third side and a fourth side opposite to the third side, a direction from the first side to the second side is a first direction, a direction from the third side to the fourth side is a second direction, the first direction is perpendicular to the second direction; and the center of gravity of the water cooling module and the center of gravity of the electric control box are closer to the third side than to the fourth side, and the center of gravity of the purification device and the center of gravity of the water heating module are closer to the fourth side than to the third side.

In an embodiment, the water cooling module includes:

a cooling tank provided on the base, an input port of the cooling tank being communicated with the output port of the purification device, the cooling tank being formed with the room temperature water storage area and the cold water storage area, the cooling tank having a cold water output port communicated with the cold water storage area and a warm water output port communicated with the room temperature water storage area, the cold water output port being communicated with an input port of the first water pump, the warm water output port being communicated with the input port of the second water pump; and a heat exchanger provided on the base and configured for cooling water in the cold water storage area.

In an embodiment, the cooling tank is provided on a side of the heat exchanger away from the base.

Embodiments of the present disclosure, the first water pump pumps out the cold water produced by the water cooling module, the second water pump realizes the output of warm water, and the water heating module realizes the output of hot water. The first water pump and the second water pump are used to increase the water outlet pressure, and the water outlet component of the water dispenser can discharge water at a high position.

BRIEF DESCRIPTION OF THE DRAWINGS

In order to more clearly illustrate the embodiments of the present disclosure, the following briefly introduces the accompanying drawings that need to be used in the description of the embodiments or the prior art. The drawings in the following description are only some embodiments of the present disclosure. Other drawings can also be obtained based on the structures shown in these drawings.

Figure 1:
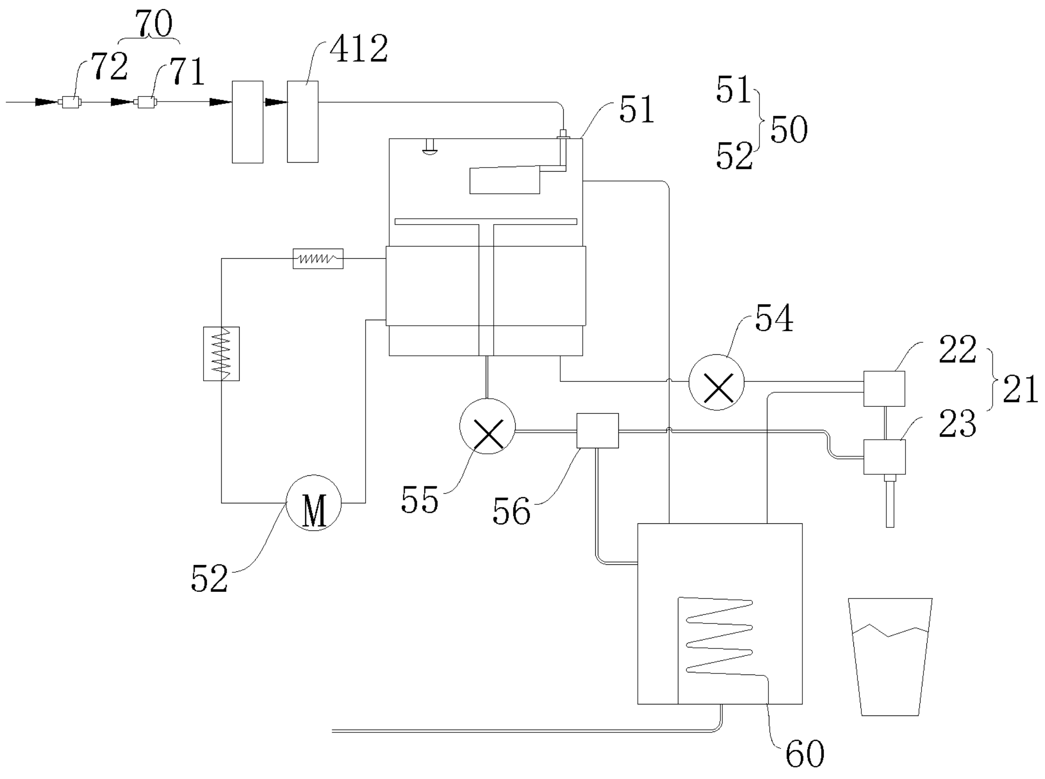
FIG. 1 is a schematic structural view of a water system according to an embodiment of the present disclosure.

The realization of the objective, functional characteristics, and advantages of the present disclosure are further described with reference to the accompanying drawings.

DETAILED DESCRIPTION OF THE DISCLOSURE

The embodiments of the present disclosure will be described in more detail below with reference to the accompanying drawings. The embodiments to be described are only some rather than all of the embodiments of the present disclosure. All other embodiments based on the embodiments of the present disclosure shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a posture (as shown in the drawings). If the specific posture changes, the directional indication will change accordingly.

Besides, the descriptions associated with, e.g., "first" and "second," in the present disclosure are merely for descriptive purposes, and cannot be understood as indicating or suggesting relative importance or impliedly indicating the number of the indicated feature. Therefore, the feature associated with "first" or "second" can expressly or impliedly include at least one such feature. When the combination of embodiments is contradictory or cannot be achieved, it should be considered that such a combination of the embodiments does not exist, nor is it within the scope of the present disclosure.

The present disclosure provides a water dispenser. The water dispenser has a housing forming the outline of the water dispenser and functional components provided in the housing to form a water system. The water system accesses the water source, and outputs cold water, hot water or warm water after heating or cooling the water source. The water dispenser can be a desktop water dispenser or a vertical water dispenser. The water dispenser can be used to access pure water, or can be used to access municipal tap water, to be used as a direct drinking machine. For the convenience of description, the following description is given by taking the water dispenser as an example of a direct drinking machine for accessing the municipal tap water. FIG. 1 to FIG. 11 are drawings corresponding to the embodiments of the present disclosure.

As shown in FIG. 1, in an embodiment, the water dispenser includes a water cooling module 50, a first water pump 54, a water outlet component 21, a second water pump 55, and a water heating module 60.

The water cooling module 50 is configured for accessing a water source. The water cooling module 50 cools the water source. The water cooling module 50 has a heat exchanger 52 for cooling the water entering the water cooling module 50 to a preset temperature to form cold water, to facilitate the output of cold water.

The input port of the first water pump 54 is communicated with the output port of the water cooling module 50. The first water pump 54 is used to pump out the cold water generated by the water cooling module 50 to increase the water pressure when the water cooling module 50 outputs cold water.

The water outlet component 21 is communicated with the output port of the first water pump 54, and the water outlet component 21 is used to realize the water outlet from the water dispenser.

The input port of the second water pump 55 is used to access a water source, and the output port of the second water pump 55 is communicated with the water outlet component 21. The second water pump 55 outputs the warm water input from the water source to the water outlet component 21 to output warm water. The warm water refers to room temperature water.

The output port of the second water pump 55 is also communicated with the input port of the water heating module 60, and the output port of the water heating module 60 is communicated with the water outlet component 21. The second water pump 55 is also configured for pumping warm water to the water outlet component 21 and pumping the room temperature water into the water heating module 60. After the warm water is heated by the water heating module 60, hot water is formed, and the hot water is outputted through the water outlet component 21.

The water source as tap water is taken as an example. After the water enters the water cooling module 50, the temperature is lowered, and after the temperature reaches the preset low temperature state, the first water pump 54 directly pumps the cold water generated by the water cooling module 50 to the water outlet component 21, the second water pump 55 can be used to increase the water pressure when the water outlet component 21 outputs warm water or hot water. When the relative height of the water outlet component 21 is high, the water outlet component 21 can achieve pressurized water outlet, and then the water outlet component 21 can be installed at a higher position on the water dispenser to discharge water at a high position.

Since the first water pump 54 and the second water pump 55 can directly pump water from the side close to the water outlet component 21, there is no need to install a water pump at the end of the water system close to the water source. The first water pump 54 is only used to pump out cold water, the second water pump 55 is only used to pump out warm water. When selecting the first water pump 54 and the second water pump 55, a water pump with a smaller overall volume can be selected to reduce the space occupied by the water pump. By reducing the volumes of the first water pump 54 and the second water pump 55, the gap between the water cooling module 50 and the water heating module 60 inside the water dispenser can be fully utilized. Since the box structure of the water cooling module and the water heating module in the water dispenser is usually cylindrical, there will be some gaps after installation. The first water pump 54 and the second water pump 55 can be installed in the gap between the water cooling module 50 and the water heating module 60, and the inner space of the water dispenser can be fully utilized. Both the first water pump 54 and the second water pump 55 can be arranged close to the water outlet component 21. When water is discharged, the length of the pipeline can be relatively shortened, to increase the water outlet pressure of the water outlet component 21. By reducing the volume of the water pump, the positions of the first water pump 54 and the second water pump 55 can be adjusted according to the internal space distribution of the water dispenser, and the first water pump 54 and the second water pump 55 can choose different installation positions, and then the first water pump 54 and the second water pump 55 can be used to balance the center of gravity of the water dispenser to improve the stability of the water dispenser.

The second water pump 55 has an input port and two output ports for delivering warm water to the water outlet component 21 and the water heating module 60. In an embodiment, the water outlet component 21 includes a second valve body 22. The input port of the second valve body 22 is communicated with the output port of the first water pump 54 and the output port of the water heating module 60 respectively. The second valve body 22 is a valve body having one output port and at least two input ports. An input port of the second valve body 22 is used to communicate with the output port of the first water pump 54 for outputting cold water. Another input port of the second valve body 22 is used to communicate with the output port of the water heating module 60 for outputting hot water. In one embodiment, the second valve body 22 may be a two-in-one-out solenoid valve.

A water outlet nozzle 23. The input port of the water outlet nozzle 23 is communicated with the output port of the second valve body 22 and the second water pump 55 respectively. The water outlet nozzle 23 has one output port and at least two input ports. One of the input ports of the water outlet nozzle 23 is used to communicate with the output port of the second valve body 22, and the water dispenser can output cold water or hot water. The other input port of the water outlet nozzle 23 is used to communicate with the second water pump 55 to directly output warm water. In one embodiment, the water outlet nozzle 23 may be a two-in-one-out solenoid valve.

In an embodiment, the water dispenser further includes a first valve body 56, the input port of the first valve body 56 is communicated with the output port of the second water pump 55, the first valve body 56 has a first output port and a second output port, and the first output port of the first valve body 56 is communicated with the input port of the water heating module 60. The second output port of the first valve body 56 is communicated with the input port of the water outlet component 21. The first valve body 56 may be a three-way valve. The second output port of the first valve body 56 is communicated with the water outlet component 21 for outputting warm water, the first output port of the first valve body 56 is used to supply warm water to the water heating module 60. When the water outlet component 21 includes the second valve body 22 and the water outlet nozzle 23, the second output port of the first valve body 56 can be communicated with the water outlet nozzle 23 of the second valve body 22 to realize warm water output.

In an embodiment, the water dispenser further includes a leak-proof component 70. The leak-proof component 70 is provided on the pipeline for accessing the water source, can be provided at the input end of the water cooling module 50 or at the input end of the second water pump 55 to prevent water leakage inside the water dispenser. The leak-proof component 70 may be a valve body that cooperates with a water leakage detection device. When water leakage is detected, the water leakage detection device controls the valve body to close.

Further, the leak-proof component 70 includes a check valve 72 and a water leakage protector 71. The input port of the check valve 72 is used to access the water source. The water leakage protector can be used as the water leakage detection device. The output port of the check valve 72 is communicated with the input port of the water cooling module 50 through the water leakage protector 71. The water leakage protector 71 may also be communicated with the input port of the second water pump 55 at the same time. The check valve 72 can be set to be normally open, and the water leakage protector 71 is used to detect whether there is water leakage in the waterway, and when the water leakage is detected, the check valve 72 is closed.

In an embodiment, the water dispenser further includes a water inlet for accessing the water source. The water cooling module 50 has a room temperature water storage area and a cold water storage area, and the room temperature water storage area is communicated with the water inlet. The input port of the second water pump 55 is communicated with the water inlet or communicated with the room temperature water storage area. The water inlet can be used to access municipal tap water, and when the leak-proof component 70 is provided, the leak-proof component 70 can be provided on the water inlet. The input port of the check valve 72 can be communicated with the water inlet, the output port of the water leakage protector 71 can be communicated with the input port of the water cooling module 50, and can also be communicated with the input port of the second water pump 55 at the same time.

The water cooling module 50 can use a cooling tank 51, and the cooling tank 51 is formed with a room temperature water storage area and a cold water storage area. The warm water entering the water cooling module 50 is replenished into the room temperature water storage area and the cold water storage area. The second water pump 55 may directly introduce warm water from the water inlet, or may introduce warm water from the room temperature water storage area of the water cooling module 50. When the input port of the second water pump 55 is communicated with the room temperature water storage area of the water cooling module 50, both the water cooling module 50 and the water heating module 60 can be close to the water outlet component 21, to reduce the distance between the water cooling module 50 and the water heating module 60, the length of the pipeline is shortened, and the water pressure of the water outlet component 21 is increased.

In an embodiment, the water dispenser further includes a purification device 412. The input port of the purification device 412 is communicated with the water inlet. The input port of the water cooling module 50 is communicated with the output port of the purification device 412. The purification device 412 is used to purify the water input to the water dispenser. The purified water can be used to transport all of the water to the water cooling module 50 and enter the cold water storage area and the room temperature water storage area of the water cooling module 50 respectively. The input port of the second water pump 55 may communicate with the output port of the purification device 412 or the room temperature water storage area. Part of the water purified by the purification device 412 may be used to supply the water cooling module 50 and part of the water purified by the purification device 412 may be used to supply the second water pump 55. When the leak-proof component 70 is provided, the output port of the water leakage protector is communicated with the purification device 412.

Since there is no need to arrange a water pump on the water path close to the water inlet, the volumes of the first water pump 54 and the second water pump 55 can be reduced accordingly, the space where the purification device 412 is located is larger, and the number of filter elements of the purification device 412 can be adjusted as required. During the installation process of the purification device 412, the selection of the installation position can be more flexible, to balance the center of gravity of the water dispenser through the purification device 412 and improve the stability of the water dispenser.

Figure 2:
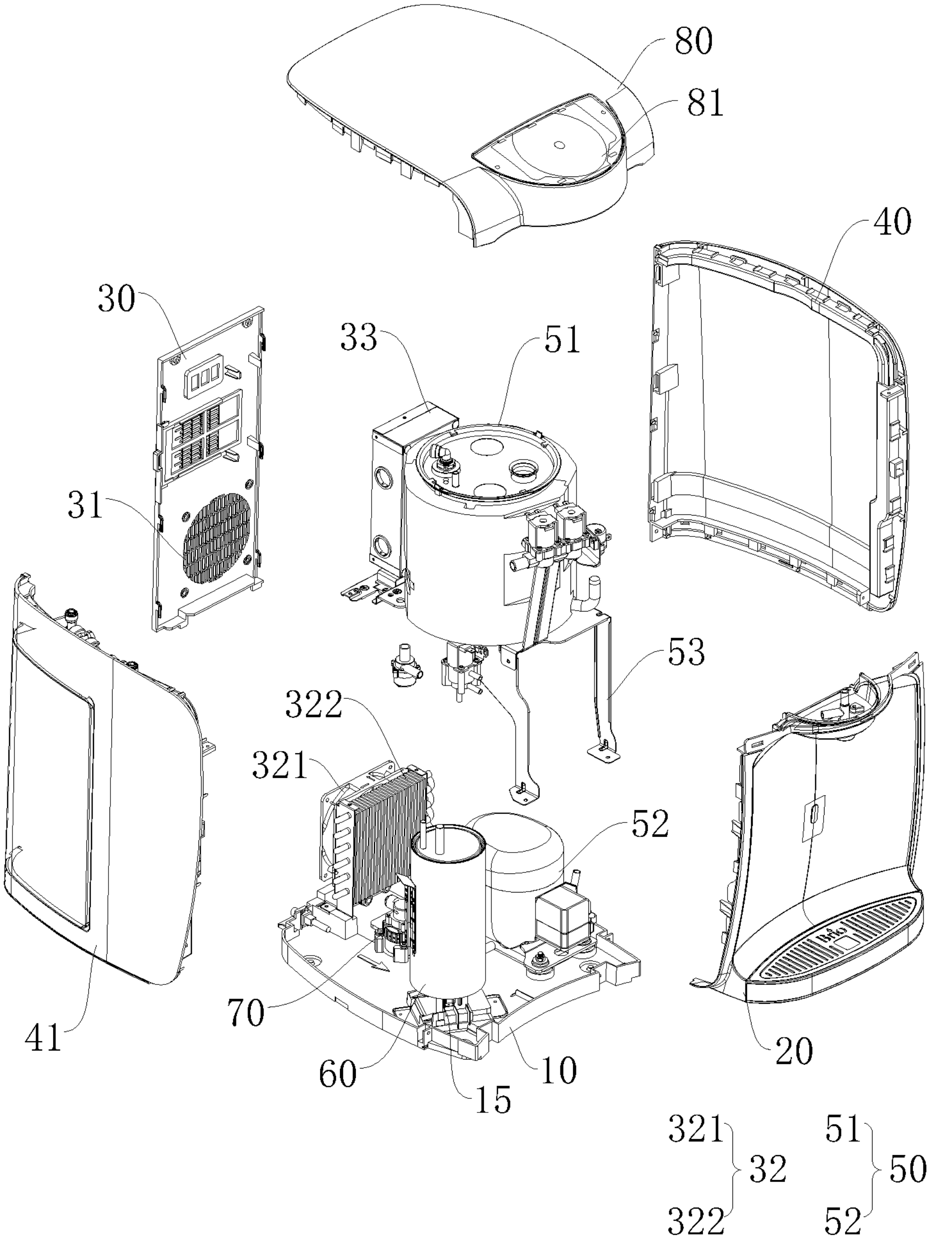
FIG. 2 is an exploded view of a water dispenser according to an embodiment of the present disclosure.
Figure 3:
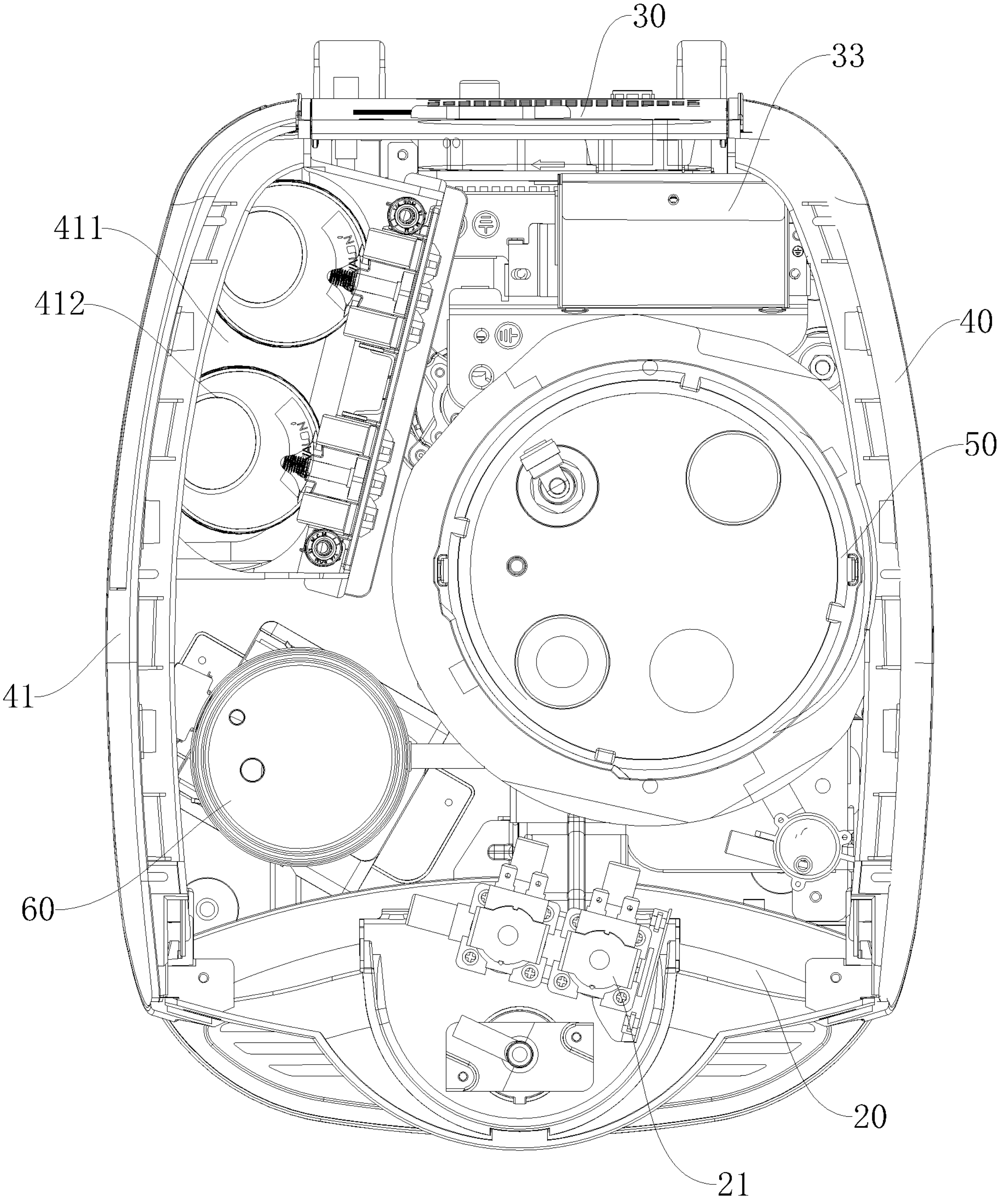
FIG. 3 is a top view of an interior of the water dispenser according to an embodiment of the present disclosure.

As shown in FIG. 2 and FIG. 3, in an embodiment, the water dispenser further includes:

A base 10. The water cooling module 50 and the water heating module 60 are respectively disposed on the base 10. The base 10 has a first side 11 and a second side 12 opposite to the first side 11. The center of gravity of the water cooling module 50 and the center of gravity of the water heating module 60 are closer to the first side 11 than to the second side. The center of gravity of the purification device 412 is closer to the second side 12 than to the first side. The base 10 has an installation surface for mounting the internal functional components of the water dispenser. The first side 11 and the second side 12 may be two opposite edges of the base 10. Taking the installation surface of the base 10 as a generally rectangular shape as an example. The first side 11 and the second side 12 are two opposite edges of a rectangular installation surface. The water cooling module 50 can be connected and fixed with the installation surface of the base 10. The water cooling module 50 is close to the first edge of the base 10 and may have a gap with the first edge of the base 10 to implement installation. The water heating module 60 is close to the first edge of the base 10 and can be disposed side by side with the water cooling module 50. The center of gravity of the purification device 412 is closer to the first side 11 of the base 10 to form a balanced state with the water cooling module 50 and the water heating module 60. The purification device 412 can be a multi-stage filter element structure, such as a two-stage filter element, a three-stage filter element or a four-stage filter element structure. In one embodiment, the height direction of the purification device 412 is perpendicular to the installation surface of the base 10, to save the space of the installation surface of the base 10.

In the existing purification device 412, in order to ensure the purification efficiency, the purification device 412 needs to have a larger volume to install the filter element. When the water source enters the purification device 412, the overall weight of the purification device 412 will increase. When the water dispenser is in use, the weight of the second side 12 where the purification device 412 is located increases, the water cooling module 50 and the water heating module 60 can balance the force on the first side 11 of the base 10 to keep the center of gravity of the base 10 close to the center of gravity of the installation surface. In order to have the preset cooling water effect, the volume of the water cooling module 50 is usually larger than that of the water heating module 60, and the volume of the purification device 412 is usually larger than that of the water heating module 60. The purification device 412 is close to the second side 12 and can form a stable state with water cooling module 50 close to the first side 11, the water heating module 60 is installed by using the gap formed between the water cooling module 50 of the first side 11 and the inner wall of the water dispenser, to make full use of the space of the water dispenser and keep the center of gravity of the product at a preset position, to improve the stability of the product.

After the water cooling module 50 and the water heating module 60 are installed side by side at a position closer to the first side 11, the center of gravity of the purification device 412 is closer to the position of the second side 12. In the top view of the water dispenser, the water cooling module 50, the water heating module 60 and the purification device 412 do not overlap each other, and there may be gaps between them. When installing the functional components such as the internal valve of the water dispenser, the installation can be facilitated, and the reasonable layout can be facilitated, to expand the functions inside the water dispenser.

Figure 4:
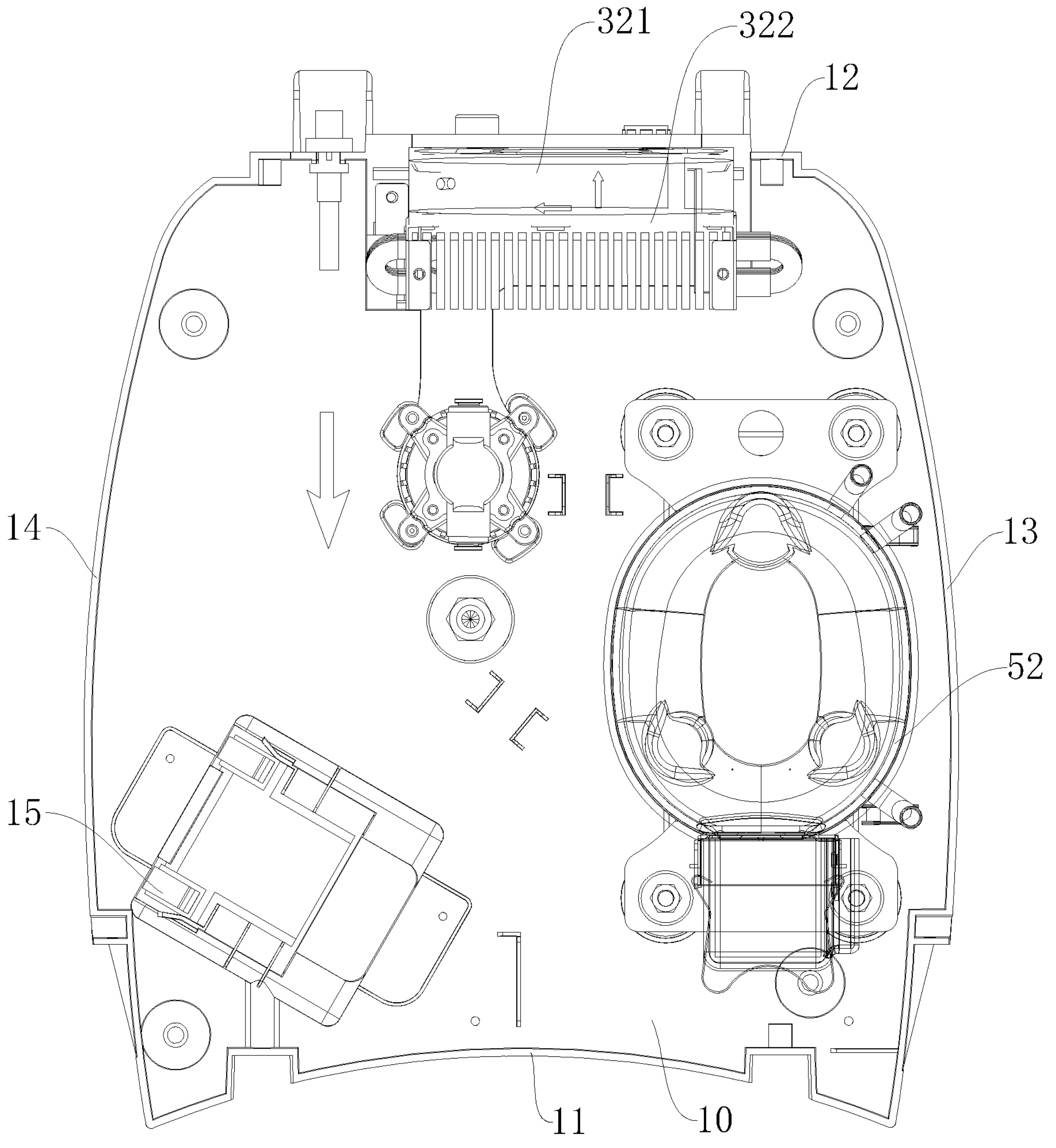
FIG. 4 is a top view of an installation surface of a base according to an embodiment of the present disclosure.

As shown in FIG. 4, in an embodiment, the length of the first side 11 of the base 10 is greater than the length of the second side 12 of the base 10, and the width of the side of the base 10 close to the first side 11 is larger. When installing the water cooling module 50 and the water heating module 60, the water cooling module 50 and the water heating module 60 may be staggered from each other, and a predetermined distance may be maintained between them to prevent them from interfering with each other. When installing the water cooling module 50, since the volume of the water cooling module 50 is usually large, the installation surface of the base 10 increases gradually from the second side 12 to the first side 11, a cooling tank 51 with a larger volume can be set as required to meet the demand for cooling water.

Figure 5:
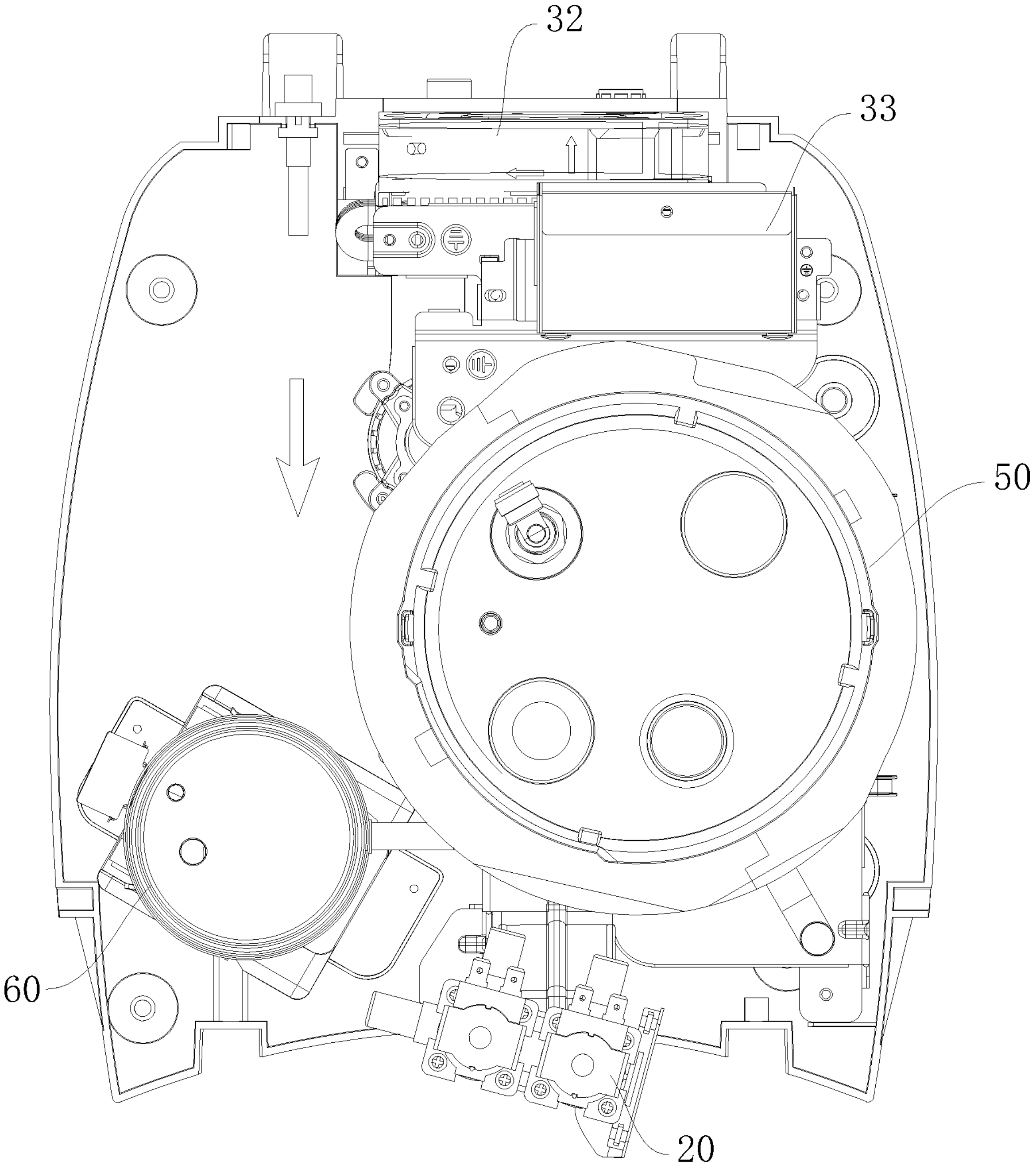
FIG. 5 is a top view of the base in the assembled state according to an embodiment of the present disclosure.
Figure 6:
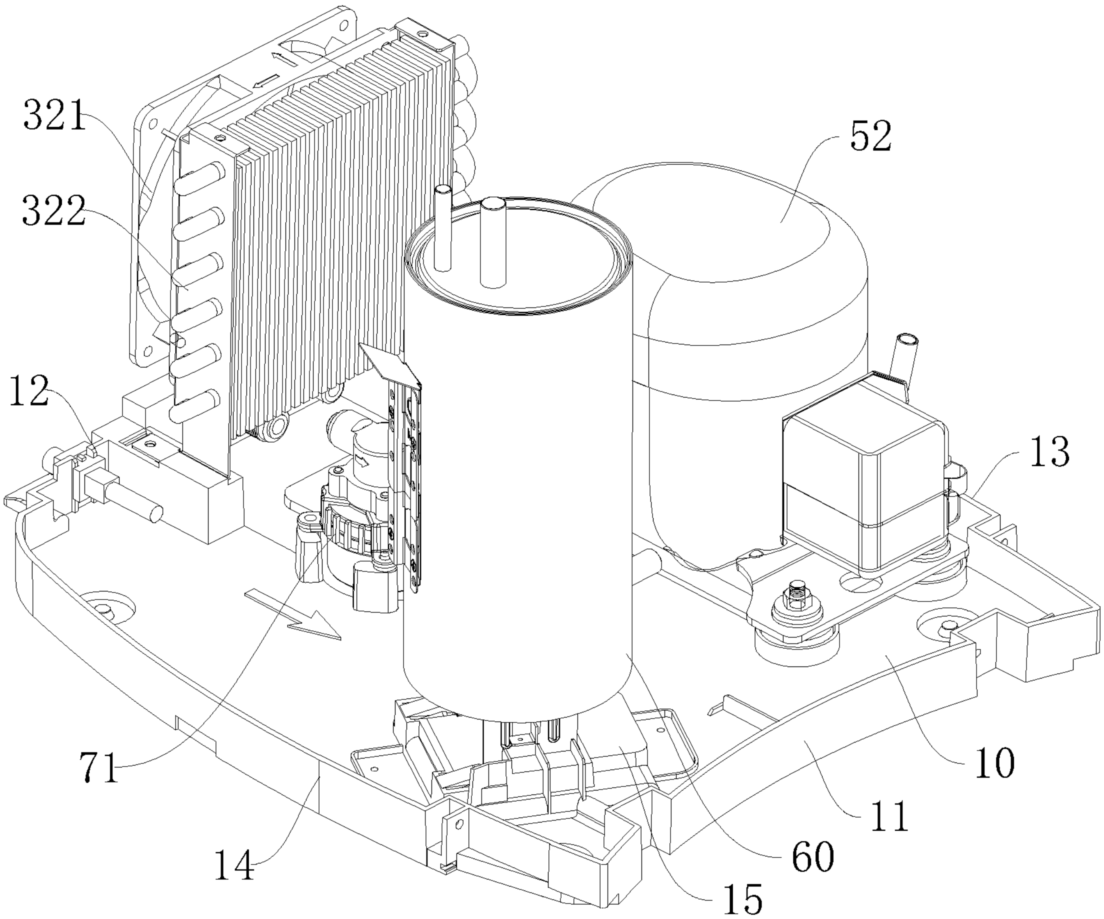
FIG. 6 is a schematic structural view of a heat exchanger in the assembled state according to an embodiment of the present disclosure.

As shown in FIG. 5 and FIG. 6, since the purification device 412 is close to the second side 12 of the base 10, and the water cooling module 50 and the water heating module 60 are close to the first side 11 of the base 10, respectively, in the top view of the water dispenser, the water cooling module 50, the water heating module 60 and the purification device 412 are not overlapped with each other, which can facilitate the arrangement of the internal waterway. Since the volume of the purification device 412 is generally large, the purification device 412 and the water cooling module 50 are staggered from each other, and there is no interference between the water cooling module 50 and the purification device 412. When installing the water outlet component 21, the water outlet component 21 can be provided on the side close to the first side 11 of the base 10, to reduce the path length of the water pumped by the first water pump 54 and the second water pump 55 to the water outlet component 21, which is helpful to increase the water pressure of the water outlet component 21 and discharge water at a high position.

As shown in FIG. 2 and FIG. 4, in an embodiment, the base 10 is provided with an installation interface 15, and the water heating module 60 is detachably installed on the installation interface 15. The installation interface 15 can be detachably installed on the base 10, or can be connected and fixed with the base 10. The installation interface 15 is used for connecting the water heating module 60 with the purification device 412, and may also be used only for fixing the water heating module 60. The water heating module 60 is usually a tank with a heating device, and one end of the water heating module 60 can be connected to the installation interface 15. The other end of the water heating module 60 extends away from the base 10. The height direction of the tank body of the water heating module 60 is perpendicular to the installation surface of the base 10, to reduce the space occupied by the water heating module 60 on the side of the first side 11 of the base 10.

As shown in FIG. 2 and FIG. 3, in an embodiment, the water dispenser has a housing, and the housing includes a front housing 20 and a rear housing 30.

The front housing 20 is provided on the first side 11 of the base 10. A water outlet component 21 may be provided on the front housing 20 for connecting the water cooling module 50 and the water heating module 60 to discharge water. The water outlet component 21 may be formed by a solenoid valve in cooperation with the water outlet nozzle 23 to control the water outlet.

The rear housing 30 is provided on the second side 12 of the base 10. The rear housing 30 is opposite to the front housing 20. The front housing 20 and the rear housing 30 can be connected and fixed with the base 10 to form an integral structure, or can be set as a detachable structure. The water cooling module 50 and the water heating module 60 are close to the front housing 20. When water is output, the distance from the cold water produced by the water cooling module 50 and the hot water produced by the water heating module 60 to the water outlet component 21 is reduced, which can realize rapid output of cold water and rapid output of hot water to reduce waste of water resources. Through the first water pump 54 and the second water pump 55, the water pressure of the water outlet component 21 is increased, and at the same time, a shorter water outlet pipeline is matched, the water pressure of the water outlet component 21 is further increased, to make the water outlet efficiency of the water outlet component 21 higher. The rear housing 30 of the water dispenser is usually close to a wall or a water source, and the purification device 412 is closer to the second side 12, a water inlet can be conveniently provided from one side of the rear housing 30, and the purification device 412 can access the tap water, to realize the nearby water supply and shorten the length of the water supply pipeline.

Figure 7:
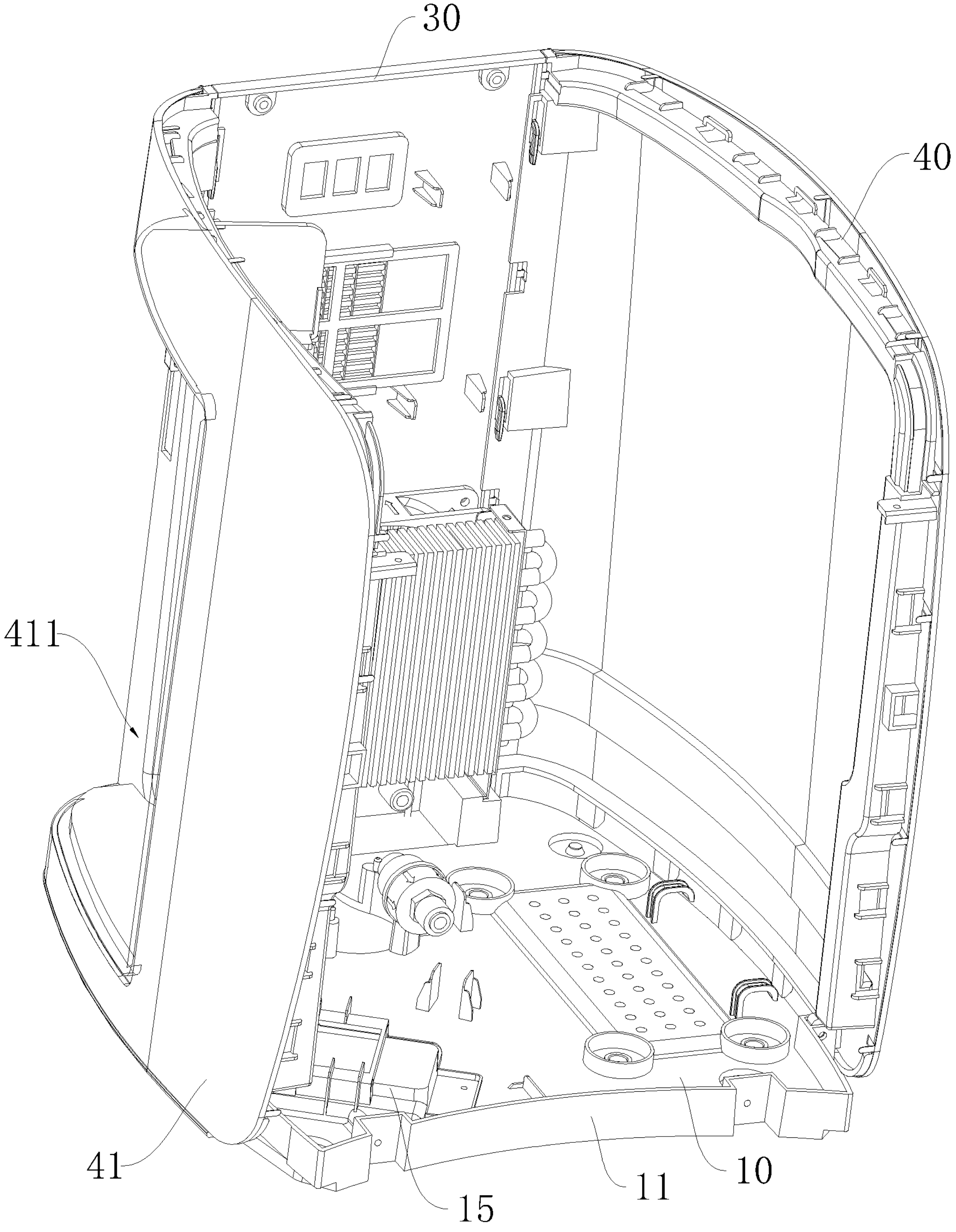
FIG. 7 is a schematic structural view of a housing of the water dispenser in an open state according to an embodiment of the present disclosure.
Figure 8:
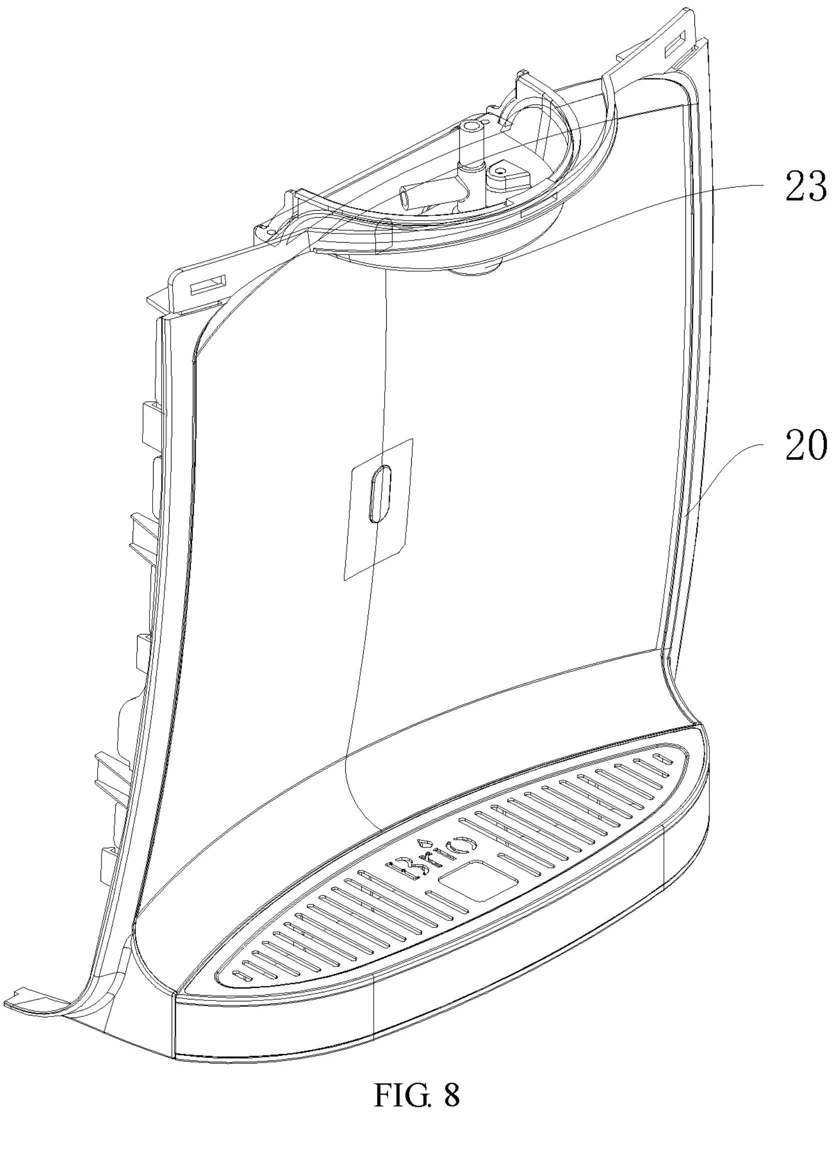
FIG. 8 is a schematic structural view of a front housing according to an embodiment of the present disclosure.

As shown in FIG. 3, FIG. 7 and FIG. 8, the base 10 has a third side 13 and a fourth side 14 opposite to the third side 13, a direction from the first side 11 to the second side 12 is a first direction, a direction from the third side 13 to the fourth side 14 is a second direction, and the first direction is perpendicular to the second direction. The housing further includes a first side plate 40 provided on the third side 13, and a second side plate 41 provided on the fourth side 14. The purification device 412 is provided on the second side plate 41. The first side plate 40 is opposite to the second side plate 41. The front housing 20, the first side plate 40, the rear housing 30, the second side plate 41 and the base 10 are enclosed to form a hollow structure. The water dispenser may further include a top cover 80 opposite to the base 10 for closing the hollow structure. When making the housing, a control panel 81 may be provided on the top cover 80 or the front housing 20 to control the operation of various components, and may also be used to display information such as water temperature or water level.

Figure 9:
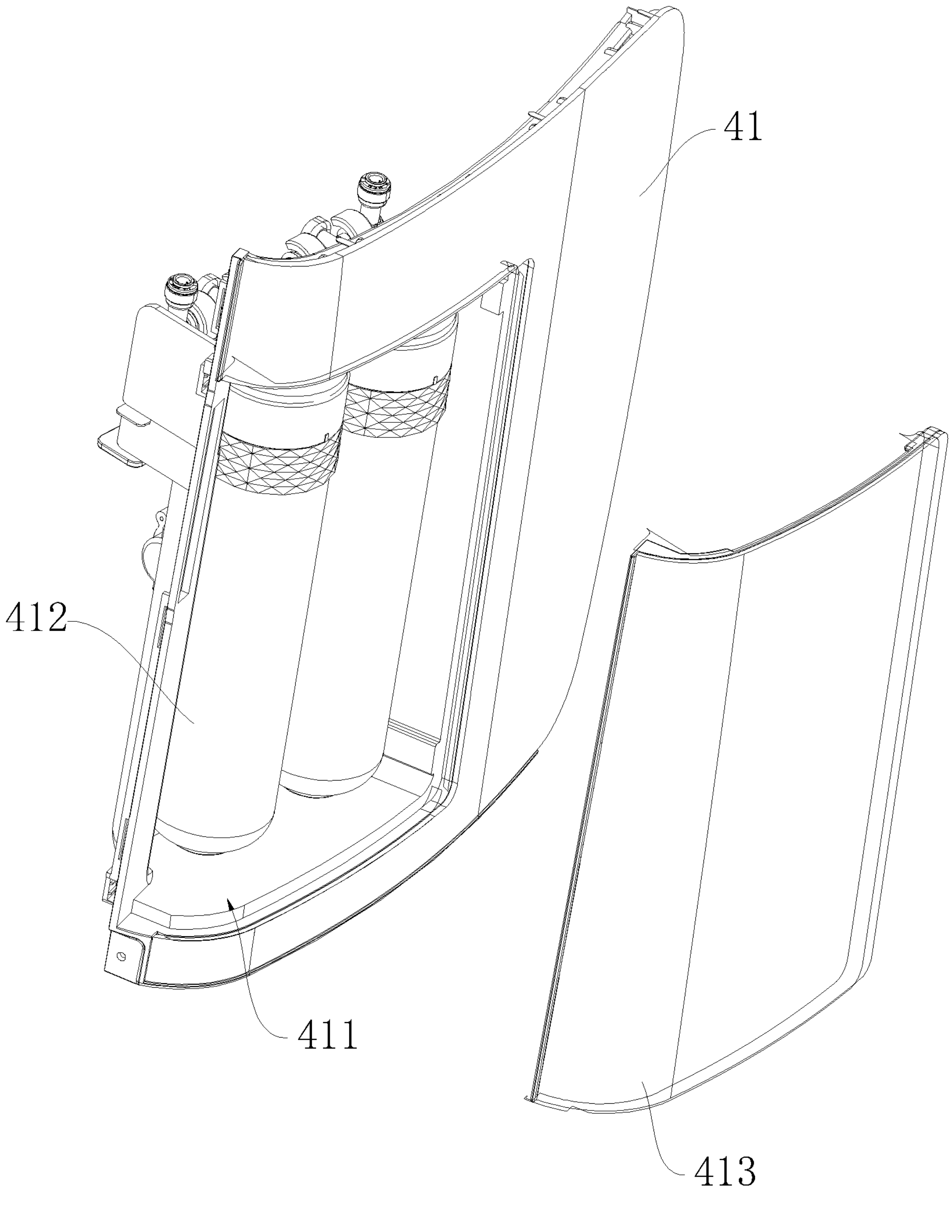
FIG. 9 is a schematic structural view of a second side plate according to an embodiment of the present disclosure.

As shown in FIG. 7 and FIG. 9, in an embodiment, when the purification device 412 is installed, the second side plate 41 is provided with an accommodating cavity 411 for accommodating the purification device 412. The accommodating cavity 411 has an opening facing away from the first side plate 40. The opening of the accommodating cavity 411 faces the outside of the water dispenser, and the purification device 412 can be detached from the outside of the water dispenser. Since the filter element of the purification device 412 needs to be regularly maintained, the opening of the accommodating cavity 411 faces the outside of the water dispenser, and the filter element can be disassembled and maintained without opening the top cover 80 of the water dispenser. When manufacturing the second side plate 41, a cover plate 413 for closing the opening can be provided on the second side plate 41, to hide the purification device 412 inside the accommodating cavity 411.

The water dispenser has a water inlet for accessing a water source, the water inlet may be provided inside the water dispenser, and a check valve 72 for connecting the water inlet is provided on the second side plate 41 for accessing the water source. In one embodiment, the water dispenser further includes a water leakage protector 71 provided on the base 10, the purification device 412 is connected to the water source through the water leakage protector 71, and the water leakage protector 71 is provided between the purification device 412 and the water cooling module 50. The water leakage protector 71 is used to automatically close the valve when water leakage occurs in the pipeline of the water dispenser. The water leakage protector 71 may be provided between the purification device 412 and the check valve 72.

Since the purification device 412 is provided in the accommodating cavity 411 formed on the second side plate 41, and the purification device 412 is close to the second side 12 of the base 10, the center of gravity of the purification device 412 and the center of gravity of the water cooling module 50 are respectively close to two opposite top corners of the base 10 to balance the weight of the water dispenser. When the opening of the accommodating cavity 411 for accommodating the purification device 412 faces the outside of the water dispenser, the purification device 412 will not affect the electric control box 33 and the cooling device 32. The water cooling module 50, the water heating module 60, and the purification device 412 are separated from the electric control box 33, and the components for accommodating liquid are separated from the electric control box 33, which can improve the safety of the electric control box 33.

The center of gravity of the water cooling module 50 and the center of gravity of the water heating module 60 are closer to the first side 11 than to the second side mean that the outermost edges of the water cooling module 50 and the water heating module 60 are close to the first side 11. In order to improve safety and facilitate installation, there are gaps among the water cooling module 50, the water heating module 60 and the front housing 20, there is a gap between the water cooling module 50 and the first side plate 40, and there is a gap between the water heating module 60 and the second side plate 41.

Figure 10:
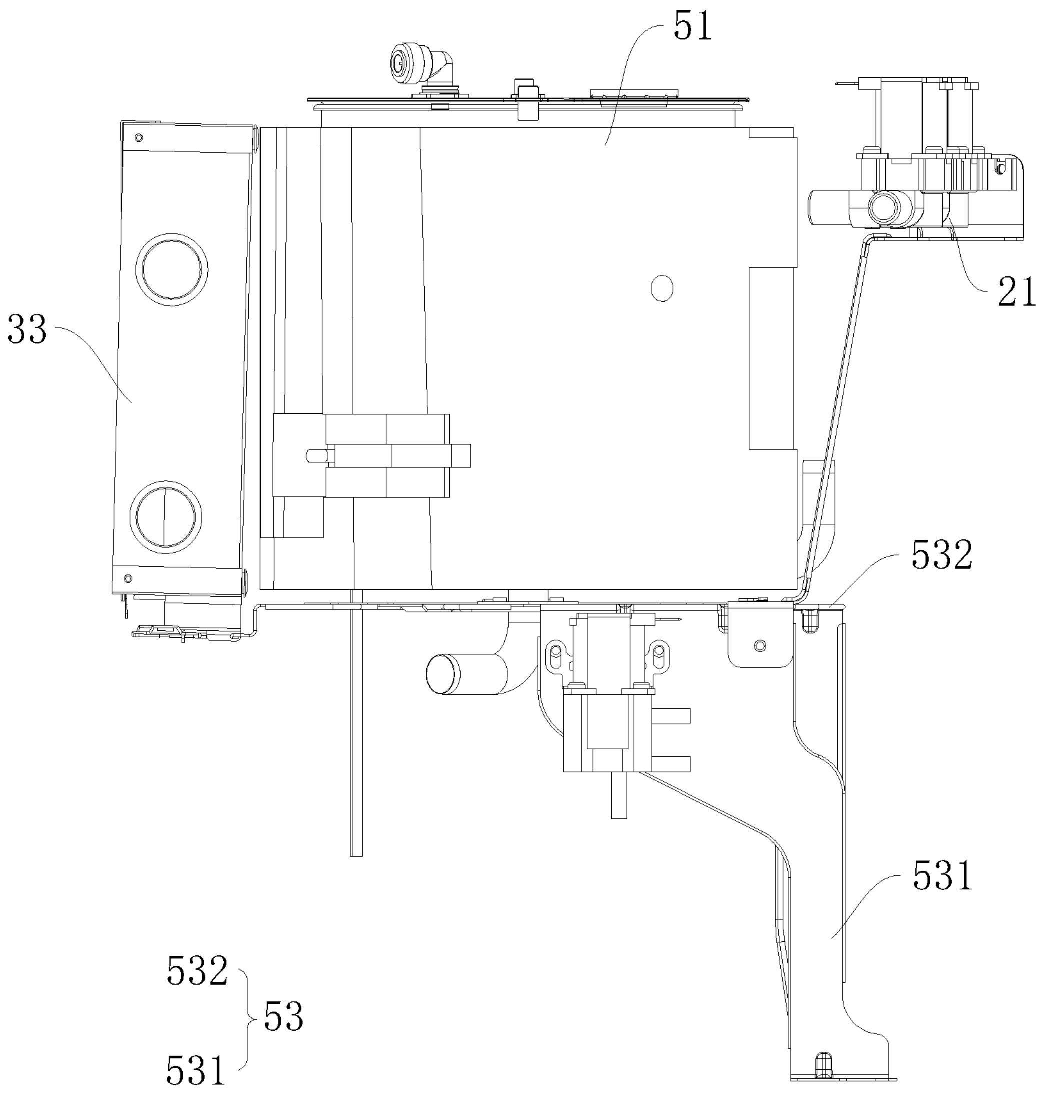
FIG. 10 is a schematic structural view of a cooling tank and a cooling tank bracket according to an embodiment of the present disclosure.

As shown in FIG. 2 and FIG. 10, in an embodiment, the water cooling module 50 includes a cooling tank 51 and a heat exchanger 52.

The cooling tank 51 is provided on the base 10, and the cooling tank 51 is connected with the purification device 412. The cooling tank 51 has an input port. The input port of the cooling tank 51 is communicated with the output port of the purification device 412, and the purification device 412 purifies the water source and then sends it to the cooling tank 51. A room temperature water storage area and a cold water storage area are formed in the cooling tank 51. The cold water storage area is used to cool the water input by the purification device 412 to form cold water and output it. The room temperature water storage area is used to access the room temperature water input from the purification device 412 to the cooling tank 51. When the water dispenser needs to output room temperature water, the room temperature water can be outputted directly through the room temperature water storage area of the cooling tank 51.

The heat exchanger 52 is provided on the base 10, and the heat exchanger 52 is provided between the cooling tank 51 and the base 10, and is used for cooling the water in the cold water storage area. The heat exchanger 52 may be a compressor for cooling the water in the cold water storage area of the cooling tank 51 to form cold water.

Since the weight of the heat exchanger 52 is generally heavy, by arranging the heat exchanger 52 at the bottom of the cooling tank 51, the overall center of gravity of the water cooling module 50 can be moved downward, and the stability of the water dispenser can be improved. When the heat exchanger 52 is arranged on the side of the cooling tank 51 facing the base 10, in the top view of the water dispenser, the heat exchanger 52 does not occupy space alone, and does not affect the overall center of gravity of the water dispenser. The occupancy rate of the space on the installation surface of the base 10 can be reduced, to improve the space utilization rate of the water dispenser.

The cooling tank 51 has the functions of outputting cold water and outputting warm water at the same time. Since the centers of gravity of the water cooling module 50 and the water heating module 60 are both closer to the first side 11 than to the second side, when the warm water storage area of the cooling tank 51 is connected to the input port of the water heating module 60, the connecting pipeline between the cooling tank 51 and the water heating module 60 can be relatively shortened, to make the pipeline layout inside the water dispenser more compact. When the compressor is installed under the cooling tank 51, there will generally be a gap between the compressor and the cooling tank 51, the pipeline for connecting the warm water storage area and the water heating module 60 can be arranged on the side close to the heat exchanger 52, to make full use of the space between the cooling tank 51 and the heat exchanger 52.

In an embodiment, the cooling tank 51 is provided with a cold water storage area and a room temperature water storage area. The cold water storage area is used to cool the water input by the purification device 412 to form cold water and output it. The room temperature water storage area is used to access the room temperature water input from the purification device 412 to the cooling tank 51. The base 10 has a third side 13 and a fourth side 14 opposite to each other. The direction from the first side 11 to the second side 12 is the first direction. The direction from the third side 13 to the fourth side 14 is the second direction. The first direction and the second direction are perpendicular to each other. Since there is a cold water storage area and a room temperature water storage area at the same time, the volume of the cooling tank 51 will be relatively increased. When installing the cooling tank 51, the center of gravity of the base 10 can be taken as the center. Taking the direction from the first side 11 to the second side 12 as the Y axis, and taking the direction from the third side 13 to the fourth side 14 as the X axis, four quadrants are formed, the center of gravity of the cooling tank 51 may be located in the fourth quadrant, the water heating module 60 may be located in the third quadrant, and the purification device 412 may be located in the second quadrant.

When the length of the first side 11 is greater than the length of the second side 12, the width of the side where the cooling tank 51 and the water heating module 60 are located is relatively large. In this case, a cooling tank 51 with a larger volume can be selected to increase the capacity of the cooling tank 51. When the volume of the cooling tank 51 increases, the center of gravity of the cooling tank 51 may be close to the Y axis. When a cooling tank 51 with a smaller volume is selected, the center of gravity of the cooling tank 51 can be set in the fourth quadrant.

As shown in FIG. 10, the water cooling module 50 further includes a cooling tank bracket 53, including a support 531 and a support portion 532. One end of the support 531 is connected to the base 10, and the other end of the support 531 extends away from the base 10. The cooling tank bracket 53 is used to overhead the cooling tank 51 on the side of the heat exchanger 52 away from the base 10, to form a space for accommodating the heat exchanger 52 between the cooling tank 51 and the base 10. The support portion 532 is connected to an end of the support 531 away from the base 10, and the cooling tank 51 is connected to the support portion 532. The support portion 532 is used to form a platform for installing the cooling tank 51, and the cooling tank 51 is overhead on the side of the heat exchanger 52 away from the base 10. After the cooling tank bracket 53 sets the cooling tank 51 overhead above the heat exchanger 52, a pipeline for connecting the cooling tank 51 may be provided in a gap between the support portion 532 and the heat exchanger 52. When manufacturing or installing the water cooling module 50, the cooling tank 51 and the cooling tank bracket 53 can be disassembled as a whole, or can be disassembled separately.

In the water system of the water dispenser, the input port of the second water pump 55 is connected to the room temperature water storage area of the cooling tank 51 to pump the water in the room temperature water storage area of the cooling tank 51 into the hot tank or the water outlet component 21.

Figure 11:
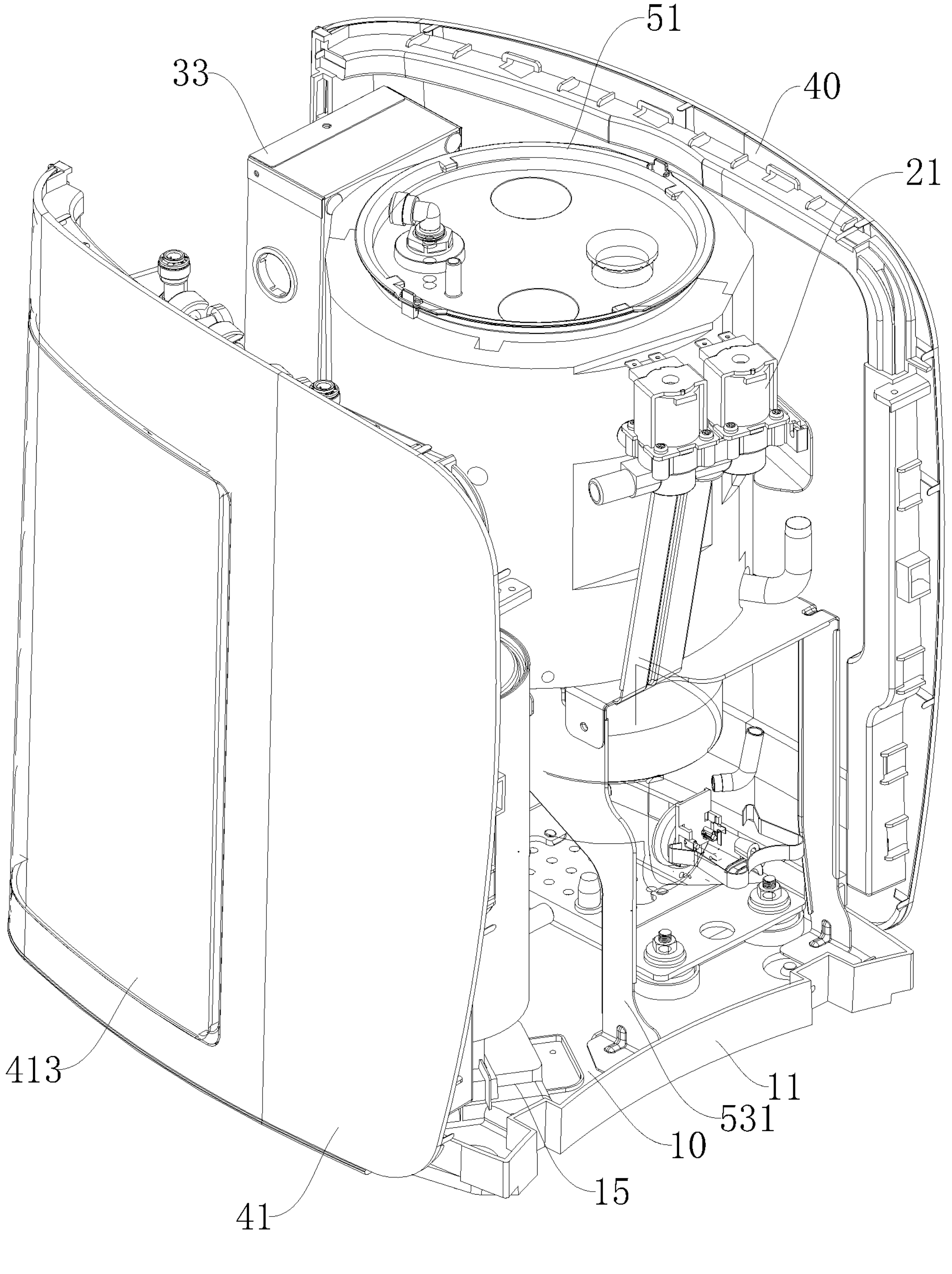
FIG. 11 is a schematic structural view of the first side plate and the second side plate in the assembled state according to an embodiment of the present disclosure.

As shown in FIG. 2, FIG. 3 and FIG. 11, the water dispenser further includes an electric control box 33 provided on the base 10. The center of gravity of the electric control box is closer to the second side 12 than to the first side. The electric control box 33 is electrically connected to the water cooling module 50, the water heating module 60 and the purification device 412 respectively. The electric control box 33 is provided with a control circuit, which can electrically connect the control panel 81 to the electric control box 33, to display the operating status of each component on the control panel 81, the opening and closing of the valve body can also be controlled through the control panel 81. The center of gravity of the electric control box 33 is closer to the second side 12 than to the first side. Since the weight and volume of the water cooling module 50 are generally large, the weight of the device used for cooling is also generally large. From the second side 12 to the first side 11, the electric control box 33, the purification device 412 and the water heating module 60 may be disposed on the outer circumference of the water cooling module 50 in a semi-enclosed state to balance the weight of the water cooling module 50. When the filter device is a multi-stage filter element, the multi-stage filter element is arranged at the position of the base 10 close to the second side 12 at intervals, the center of gravity of the multi-stage filter element is closer to the fourth side 14 than to the third side, and is arranged on the side of the cooling tank 51 in a semi-enclosed manner with the water heating module 60 and the electric control box 33.

When installing the electric control box 33, the rear housing 30 can be installed close to the second side 12 of the base 10, and the electric control box 33 can be installed on the rear housing 30. When the base 10 includes the third side 13 and the fourth side 14, the third side 13 is provided with a first side plate 40, the electric control box 33 can be close to the first side plate 40, the electric control box 33 and the water cooling module 50 are arranged side by side and close to the first side plate 40, the purification device 412 and the water heating module 60 are adjacent to the second side plate 41 side by side. Since the electric control box 33 is also close to the second side 12 of the base 10, the water heating module 60 is close to the first side 11 of the base 10. The control box and the water heating module 60 can be mutually dislocated, to prevent the electric control box 33 from being affected by the heat generated during the operation of the water heating module 60. In the water system of the water dispenser, the electric control box 33 can be electrically connected to the first water pump 54 and the second water pump 55 to control the start and stop of the first water pump 54 and the second water pump 55.

Further, the water dispenser further includes a cooling device 32 located on the side of the electric control box 33 toward the base 10. The center of gravity of the cooling device is closer to the second side 12 than to the first side, and is used for cooling the inside of the water dispenser. The cooling device 32 is used to form cold air to cool the functional components inside the water dispenser. In an embodiment, the cooling device 32 includes a fan 321 and a condenser 322. The fan 321 is used to draw the air outside the water dispenser into the water dispenser, and when the airflow passes through the condenser 322, the cold energy on the condenser 322 is brought into the water dispenser. In one embodiment, the cooling device 32 may be provided on the rear housing 30, and the heat dissipation holes 31 may be provided on the rear housing 30. The heat dissipation hole 31 may be provided with a structure such as a grille to prevent foreign objects from entering the inside of the water dispenser. The fan 321 is disposed on the side of the rear housing 30 facing the front housing 20, and the fan 321 is hidden.

The cooling device 32 is provided on the side of the electric control box 33 facing the base 10. In the top view of the water dispenser, the cooling device 32 does not occupy space, and the electric control box 33 can be easily installed and maintained. Both the cooling device 32 and the electric control box 33 are disposed close to the second side 12 of the base 10, to increase the load-bearing capacity of the second side 12, the force of the installation surface of the base 10 is balanced, and the center of gravity of the base 10 can be maintained at a preset position.

What is claimed is:

1. A water dispenser comprising:

a water outlet component;

a water cooling module for accessing a water source, an output port of the water cooling module being communicated with the water outlet component through a first water pump;

a water inlet for accessing the water source; and a first valve body;

wherein an input port of the first valve body is communicated with an output port of a second water pump, the first valve body has a first output port and a second output port, the first output port of the first valve body is communicated with the input port of the water heating module, and the second output port of the first valve body is communicated with an input port of the water outlet component;

wherein the water cooling module has a room temperature water storage area communicated with the water inlet and a cold water storage area, and an input port of the second water pump is communicated with the water inlet or the room temperature water storage area.

2. The water dispenser of claim 1, wherein the water outlet component comprises:

a second valve body, an input port of the second valve body being communicated with an output port of the first water pump and the output port of the water heating module; and a water outlet nozzle, an input port of the water outlet nozzle being communicated with an output port of the second valve body and the second output port of the first valve body.

3. The water dispenser of claim 1, further comprising:

a purification device;

wherein an input port of the purification device is communicated with the water inlet, an input port of the water cooling module communicated with an output port of the purification device, and the input port of the second water pump communicated with the output port of the purification device or the room temperature water storage area.

4. The water dispenser of claim 3, further comprising:

a leak-proof component;

wherein the purification device is communicated with the water inlet through the leak-proof component.

5. The water dispenser of claim 4, wherein the leak-proof component comprises:

a check valve, an input port of the check valve being communicated with the water inlet; and a water leakage protector, an output port of the check valve being communicated with the input port of the purification device through the water leakage protector.

6. The water dispenser of claim 3, further comprising:

a base;

wherein both the water cooling module and the water heating module are provided on the base, the base having a first side and a second side opposite to the first side, wherein a center of gravity of the water cooling module and a center of gravity of the water heating module are closer to the first side than to the second side, a center of gravity of the purification device closer to the second side than to the first side.

7. The water dispenser of claim 6, further comprising:

an electric control box provided on the base;

wherein a center of gravity of the electric control box is closer to the second side than to the first side, and wherein the water cooling module, the first water pump, the water outlet component, the second water pump and the water heating module are respectively electrically connected to the electric control box.

8. The water dispenser of claim 7, further comprising:

a cooling device provided on a side of the electric control box toward the base;

wherein a center of gravity of the cooling device is closer to the second side than to the first side, the cooling device electrically connected to the electric control box, and the cooling device configured for cooling an inside of the water dispenser.

9. The water dispenser of claim 7, wherein:

the base has a third side and a fourth side opposite to the third side, a direction from the first side to the second side being a first direction, a direction from the third side to the fourth side being a second direction, the first direction being perpendicular to the second direction; and wherein the center of gravity of the water cooling module and the center of gravity of the electric control box are closer to the third side than to the fourth side, and wherein the center of gravity of the purification device and the center of gravity of the water heating module are closer to the fourth side than to the third side.

10. The water dispenser of claim 6, wherein the water cooling module comprises:

a cooling tank provided on the base, having an input port communicated with the output port of the purification device, the cooling tank being formed with the room temperature water storage area and the cold water storage area, and having a cold water output port communicated with the cold water storage area and a warm water output port communicated with the room temperature water storage area, the cold water output port being communicated with an input port of the first water pump, the warm water output port being communicated with the input port of the second water pump; and a heat exchanger provided on the base and configured for cooling water in the cold water storage area.

11. The water dispenser of claim 10, wherein the cooling tank is provided on a side of the heat exchanger away from the base.

12. The water dispenser of claim 1, further comprising a water heating module, an input port of the water heating module accessing the water source through the second water pump, an output port of the water heating module being communicated with the water outlet component, the water outlet component accessing the water source through the second water pump.

* * * * *